US 12,449,382 B2

United States Patent
Troise

(10) Patent No.: US 12,449,382 B2
(45) Date of Patent: Oct. 21, 2025

(54) PRODUCTION OF ADDITIVELY MANUFACTURED PARTS IN BATCHES ADAPTED FOR EFFICIENT METROLOGY

(71) Applicant: Carbon, Inc., Redwood City, CA (US)

(72) Inventor: James Patrick Troise, San Francisco, CA (US)

(73) Assignee: CARBON, INC., Redwood City, CA (US)

( * ) Notice: Subject to any disclaimer, the term of this patent is extended or adjusted under 35 U.S.C. 154(b) by 276 days.

(21) Appl. No.: 18/055,538

(22) Filed: Nov. 15, 2022

(65) Prior Publication Data

US 2023/0152246 A1 May 18, 2023

Related U.S. Application Data

(60) Provisional application No. 63/279,728, filed on Nov. 16, 2021.

(51) Int. Cl.
  *G01N 23/046* (2018.01)
  *B33Y 40/00* (2020.01)
  *G01N 23/083* (2018.01)

(52) U.S. Cl.
  CPC ............ *G01N 23/046* (2013.01); *B33Y 40/00* (2014.12); *G01N 23/083* (2013.01); *G01N 2223/04* (2013.01); *G01N 2223/419* (2013.01)

(58) Field of Classification Search
  CPC ......... B33Y 10/00; B33Y 30/00; B33Y 50/00; B33Y 50/02; B33Y 80/00; B33Y 99/00;
  (Continued)

(56) References Cited

U.S. PATENT DOCUMENTS

| | | | |
|---|---|---|---|
| 5,236,637 | A | 8/1993 | Hull |
| 5,391,072 | A | 2/1995 | Lawton et al. |

(Continued)

FOREIGN PATENT DOCUMENTS

| | | |
|---|---|---|
| WO | 2014126830 A2 | 8/2014 |
| WO | 2014126834 A2 | 8/2014 |

(Continued)

OTHER PUBLICATIONS

Jiang, J., Xu, X., Xiong, Y. et al. A novel strategy for multi-part production in additive manufacturing. Int J Adv Manuf Technol 109, 1237-1248 (2020). https://doi.org/10.1007/s00170-020-05734-8 (Year: 2020).*

(Continued)

*Primary Examiner* — David P Porta
*Assistant Examiner* — Miya Downing
(74) *Attorney, Agent, or Firm* — Myers Bigel, P.A.

(57) ABSTRACT

A method of additively manufacturing a plurality of parts in a manner that facilitates efficient collection of metrology data on the parts is described herein. The method includes the steps of: additively manufacturing a construct, the construct comprising: (i) a backing, and (ii) a plurality of parts connected to the backing; inserting the backing into an imaging apparatus in an orientation in which the plurality of parts are positioned for imaging; then imaging the plurality parts in the imaging apparatus to collect image data from each part, and then removing the construct from the imaging apparatus and separating the parts from the backing.

21 Claims, 5 Drawing Sheets

(58) Field of Classification Search
CPC ......... G01N 2223/04; G01N 2223/419; G01N 2223/646; G01N 23/046; G01N 23/083

See application file for complete search history.

(56) References Cited

U.S. PATENT DOCUMENTS

| | | | |
|---|---|---|---|
| 5,529,473 | A | 6/1996 | Lawton et al. |
| 7,438,846 | B2 | 10/2008 | John |
| 7,892,474 | B2 | 2/2011 | Shkolnik et al. |
| 8,110,135 | B2 | 2/2012 | El-siblani |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,835,568 | B2 | 12/2017 | Woods et al. |
| 11,157,795 | B2 | 10/2021 | Amir et al. |
| 2014/0348305 | A1* | 11/2014 | Blendl .................. A61B 6/583 378/207 |
| 2020/0023570 | A1* | 1/2020 | Wiest .................. C03B 19/1075 |
| 2022/0230292 | A1* | 7/2022 | Powers .................. G06T 7/001 |
| 2024/0307186 | A1* | 9/2024 | Faccioli .................. B33Y 10/00 |

FOREIGN PATENT DOCUMENTS

| | | |
|---|---|---|
| WO | 2014126837 A2 | 8/2014 |
| WO | 2015164234 A1 | 10/2015 |
| WO | 2016133759 A1 | 8/2016 |
| WO | 2016145182 A1 | 9/2016 |

OTHER PUBLICATIONS https://3dprint.com/142052/lockheed-martin-sciaky-ebam/ (Year: 2016).*

Ahmed Hussein, Liang Hao, Chunze Yan, Richard Everson, Philippe Young, "Advanced lattice support structures for metal additive manufacturing", Journal of Materials Processing Technology, vol. 213, Issue 7, 2013, pp. 1019-1026, ISSN 0924-0136. (Year: 2013).*

Bikas, et al., "Additive manufacturing methods and modelling approaches: a critical review", The International Journal of Advanced Manufacturing Technology, 83, 2016, 389-405.

Janusziewicz, et al., "Layerless fabrication with continuous liquid interface production", PNAS, 113(42), 2016, 11703-11708.

Tumbleston, et al., "Continuous liquid interface production of 3D Objects", Science, 347(6228), 2015, 1349-1352.

Budzik, et al., "Methodology for the Quality Control Process of Additive Manufacturing Products Made of Polymer Materials", Materials, 14(9): 2202, 2021, 1-19.

De Vries, Udo, "Industrial CT: 3D Inspection and Metrology for 3D Printing: CT inspection of the final part can check that the manufactured part exactly matches the initial 3D design, providing dimensional analysis and metrology of all critical internal dimensions" Quality, 60(10), 2021.

Kim, et al., "A review on quality control in additive manufacturing" Rapid Prototyping Journal, 24(3), 2017, 645-669.

Zhao, Jing, "Quality Assurance and Efficiency Enhancement for Stereolithography-based 3D and 4D Printing" Ph.D. Dissertation. University of Illinois, 2022, (162 pages).

\* cited by examiner

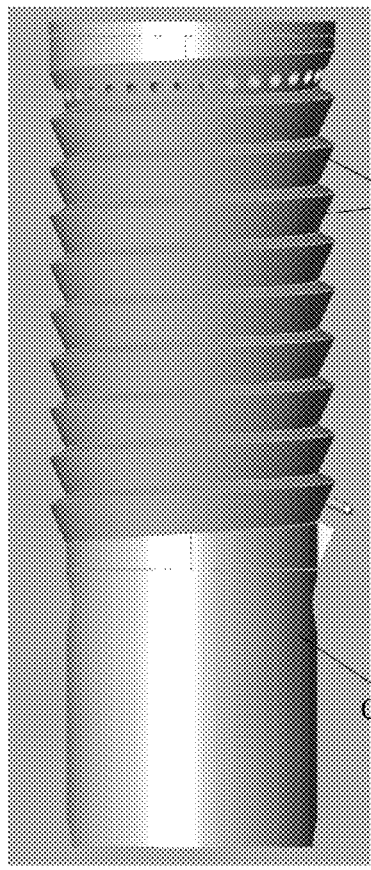
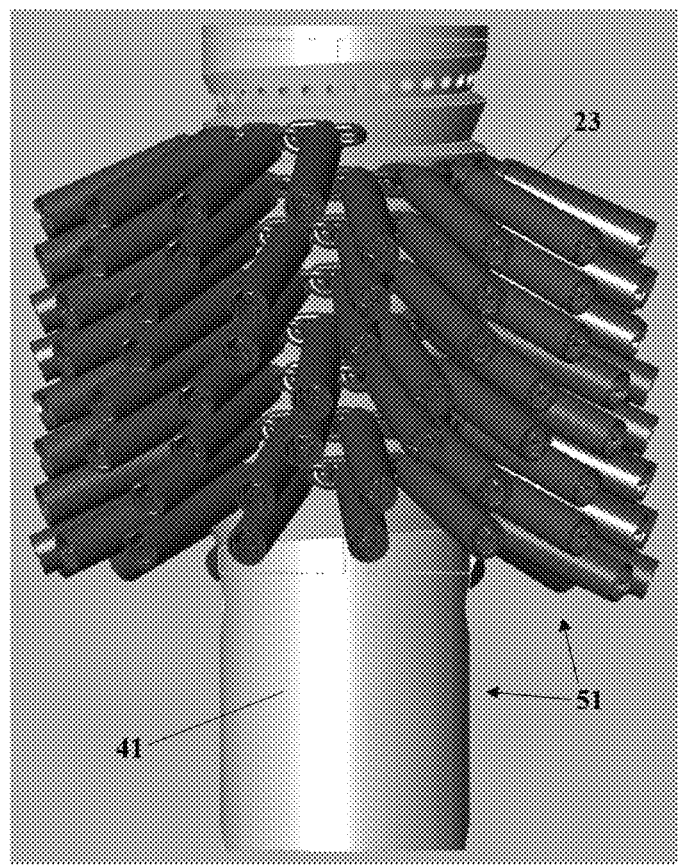
FIG. 6A
FIG. 6B

PRODUCTION OF ADDITIVELY MANUFACTURED PARTS IN BATCHES ADAPTED FOR EFFICIENT METROLOGY

RELATED APPLICATIONS

This application claims priority from U.S. Provisional Patent Application No. 63/279,728, filed Nov. 16, 2021, the disclosure of which is hereby incorporated by reference in its entirety.

FIELD

This invention concerns additive manufacturing, and particularly concerns methods of making parts by additive manufacturing in batches suitable for quality control, measuring, and testing.

BACKGROUND

The development of continuous liquid interface production (CLIP) has accelerated the transition of additive manufacturing techniques from prototyping to the production of parts intended for commercial use (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015)). This transition has in turn created a need for ways to measure and test such parts—particularly those being manufactured to precise tolerances—for quality control purposes.

CT imaging apparatus for industrial metrology are available from Nikon Metrology, Inc. (12701 Grand River Avenue, Brighton, MI 48116 USA), GOM GmbH (SchmitzstraBe 2, 38122 Braunschweig, Germany), and others. Such systems are well suited for capturing the fine details and internal features which can now be created in additively manufactured parts.

When the additively manufactured parts are, however, produced in large numbers, it can be difficult to process them through CT imaging apparatus in an efficient way that enables the timely capture of a significant amount of quality control data. Hence there is a need for new approaches to producing and handling additively manufactured objects in a way suitable for their processing through imaging apparatus.

SUMMARY

A method of additively manufacturing a plurality of parts in a manner that facilitates efficient collection of metrology data on the parts is described herein. The method includes the steps of: additively manufacturing a construct, the construct comprising: (i) a backing, and (ii) a plurality of parts connected to the backing; inserting the backing into an imaging apparatus in an orientation in which the plurality of parts are positioned for imaging; then imaging the plurality parts in the imaging apparatus to collect image data from each part, and then removing the construct from the imaging apparatus and separating the parts from the backing.

In some preferred embodiments, the inserting step includes (i) connecting or wrapping (e.g. spirally winding) the backing to or around a core (e.g., a bobbin) with the parts protruding outward from the core, and then (ii) inserting the core into the imaging apparatus.

In some preferred embodiments, the backing comprises a chain of independent, pivotably interconnected links.

Without wishing to be bound to any one specific theory of the inventions described further below, the area of a surface such as a build platform can be approximated with space filling curves. A grid of parts may be printed on a flat surface, and the freedom to arbitrarily grow geometry affords the ability to print a space-filling-curve-shaped support structure. Consequently, the two-dimensional grid of parts can be transformed into a one-dimensional sequence of parts. The flexible and configurable nature of this linear sequence enables a jump to the third dimension in the form of strategic folding, twisting and bunching. The outcome in this case is that the linear sequence can be brought to be a three-dimensional spiral by a wrapping process around a three dimensional substrate, the core or bobbin.

The foregoing and other objects and aspects of the present invention are explained in greater detail in the drawings herein and the specification set forth below. The disclosures of all United States patent references cited herein are to be incorporated herein by reference.

BRIEF DESCRIPTION OF THE DRAWING

FIG. 6A is a side view of a core, or bobbin, for use in the processes described herein.

FIG. 6B is a side view of the core of FIG. 6A now having a construct spirally wound around it with the individual parts projecting radially outward therefrom.

DETAILED DESCRIPTION OF ILLUSTRATIVE EMBODIMENTS

Figure 1:
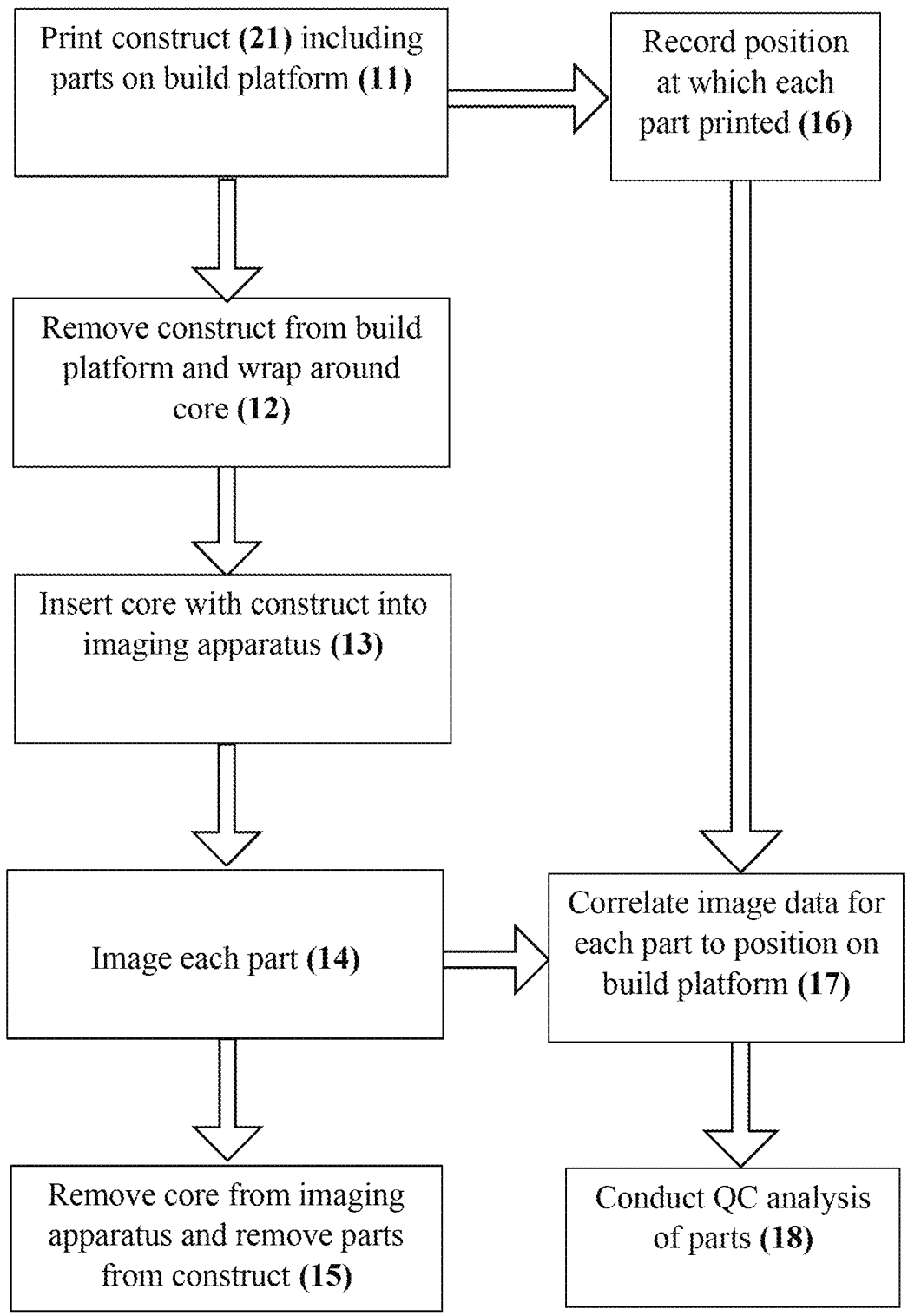
FIG. 1 is a flow chart illustrating one embodiment of a process as described herein.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Additive Manufacturing.

Techniques for additive manufacturing are known. Suitable techniques include, but are not limited to, techniques such as selective laser sintering (SLS), fused deposition modeling (FDM), stereolithography (SLA), material jetting including three-dimensional printing (3DP) and multijet modeling (MJM)(MJM including Multi-Jet Fusion such as available from Hewlett Packard), and others. See, e.g., H. Bikas et al., *Additive manufacturing methods and modelling approaches: a critical review*, Int. J. Adv. Manuf. Technol. 83, 389-405 (2016).

Resins for additive manufacturing of polymer articles are known and described in, for example, DeSimone et al., U.S. Pat. Nos. 9,211,678; 9,205,601; and 9,216,546. In some embodiments, dual cure resins are used. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Stereolithography, including bottom-up and top-down techniques, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

After the object is formed, it is typically cleaned (e.g., by washing, centrifugal separation, wiping/blowing, etc., including combinations thereof), and in some embodiments then further cured, such as by baking (although further curing may in some embodiments be concurrent with the first cure, or may be by different mechanisms such as by contacting to water, as described in U.S. Pat. No. 9,453,142 to Rolland et al.).

2. Facilitating Metrology after Additive Manufacturing.

An overview of the processes described herein is given in FIG. 1, with additional details in FIGS. 2-8. The processes include the steps of: additively manufacturing (11) a construct (21), the construct comprising: (i) a backing (22), and (ii) a plurality of parts (23) connected to the backing, inserting (13) the backing into an imaging apparatus in an orientation in which the plurality of parts are positioned for imaging; then imaging (14) the plurality parts in the imaging apparatus to collect image data from each part, and then removing (15) the construct from the imaging apparatus and separating the parts from the backing.

In some embodiments, the inserting step comprises (i) wrapping (e.g. spirally winding) the backing around a core (41) (e.g., a bobbin) with the parts protruding outward from the core, and then (ii) inserting the core into the imaging apparatus. In some embodiments, the processes optionally include the step of removing (12) the construct from the build platform and wrapping the construct around a core.

Figure 2:
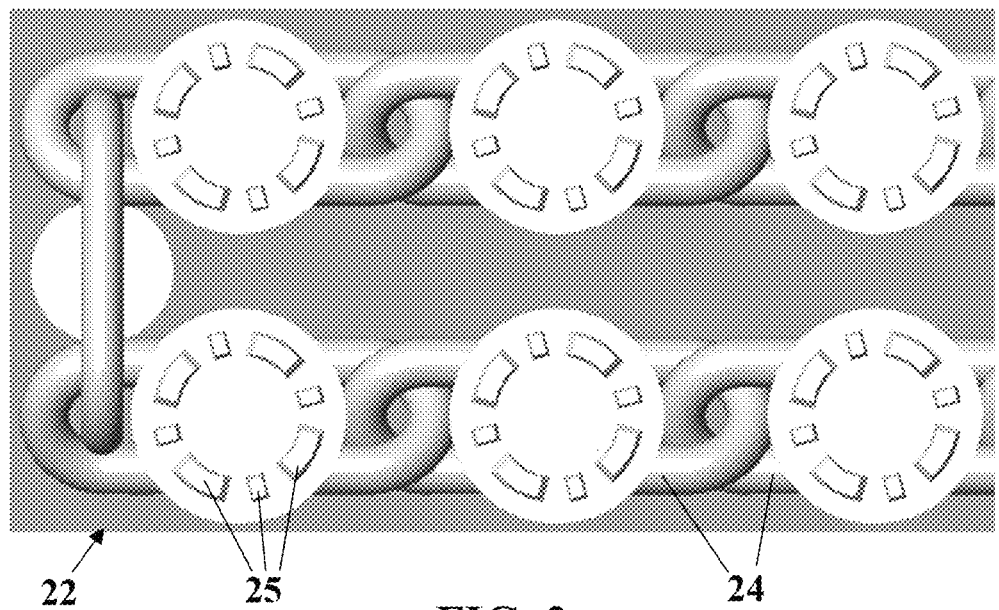
FIG. 2 is a top plan view of a backing chain as described herein. Six frangible linking segments on which additively manufactured parts may be further produced are shown.
Figure 3:
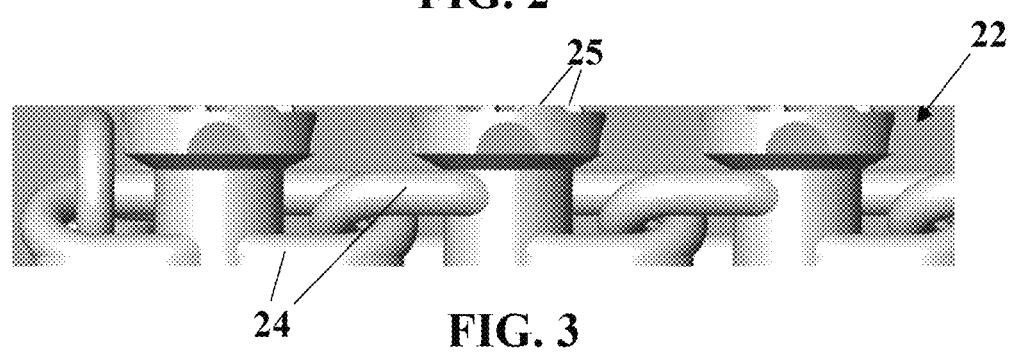
FIG. 3 is a side view of the backing chain of FIG. 2.
Figure 4:
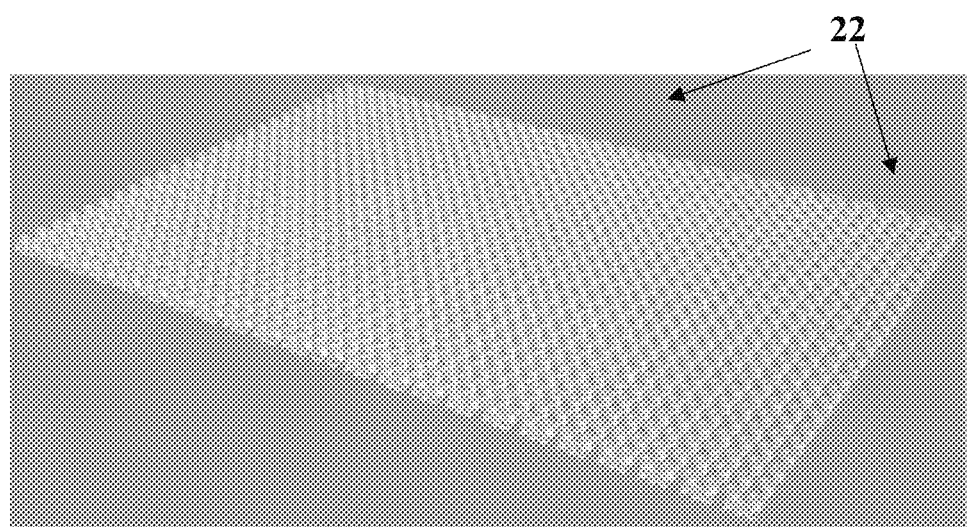
FIG. 4 is a perspective view of the backing chain of FIGS. 2-3 as to be built up in a serpentine pattern on a rectangular build platform.

In some embodiments, and as illustrated in FIGS. 2-4, the backing comprises a chain of independent, pivotably interconnected links (24). The degree of pivoting will depend upon the design of the core and the specific parts for which the backing will support. In some embodiments, adjacent links are pivotable with respect to one another around at least two axes through an arc of at least 30, 60 or 90 degrees, or more, on each axis, so that the backing can assume a variety of configurations during winding around the core.

In some embodiments, and as illustrated in the non-limiting example of FIG. 1, the method may include the steps of recording (16) a build position for each of the plurality of parts during the additively manufacturing step. In these cases, the method may further include correlating the image data (17) for each part with the build position for each the part on the build platform (e.g., to facilitate identification of defective build regions in the additive manufacturing apparatus), and/or comparing the image data for each part and/or compiled or aggregated image data for the plurality of parts, against a standard, as a quality control measure (18) of the method of manufacturing, and/or to identify defective build regions in the apparatus. Note, however, that the quality control data is useful not only for comparison against a standard (e.g., to accept or reject individual parts or parts batches), but also useful as feedback to correct or enhance dimensional capability, part performance, and the like by modifying or optimizing the part design, by modifying or optimizing the additive manufacturing process, or combinations thereof.

The image data may include two dimensional (e.g., slice) image data, three dimensional image data, or a combination thereof. Typically, the imaging apparatus comprises an X-ray imaging apparatus. In some preferred embodiments, the imaging apparatus comprises a computerized tomography (CT) scanner or computerized axial tomography (CAT) scanner.

In preferred additive manufacturing techniques, such as or top-down or bottom-up stereolithography (e.g., CLIP), the construct is additively manufactured on a build platform. Here, in some cases, the backing may be a preformed sheet, backbone, or chain mounted on the build platform. In currently preferred embodiments, however, the backing is produced by additive manufacturing during the additive manufacturing step. As noted above, particularly preferred are backings that comprise a chain additively manufactured during the additive manufacturing step prior to manufacturing the plurality of parts (e.g., the chain adhered to the build platform in a predetermined pattern such as a serpentine pattern (or space-filling curve, as further discussed below).

As shown in FIGS. 2-3 and FIGS. 5A-5B, the construct can include a frangible linker (25) between the backing and each part. The frangible linker may be mechanically formed (i.e., shaped or contoured regions that can be readily fractured) in accordance with known techniques. In an alternative approach, the additive manufacturing process may insert a different material layer between the backing and the parts, for example, a material that is weaker and hence easily fractured, a material that can be melted or weakened by heating, a material that can be dissolved with a solvent, etc.

As illustrated in FIG. 4 the backing may be produced on the build platform in the form of a serpentine curve. The shape of the curve can be varied depending on the size and shape of the parts being produced on the backing. In some embodiments, to facilitate recording the position of the parts on the build platform, the backing comprises a chain adhered to the build platform in a space filing curve, the space filing curve optionally but in some embodiments preferably comprising a Peano curve, Hilbert curve, dragon curve, Gosper curve, Moore curve, or Sierpinski curve. (see, e.g., U.S. Pat. No. 11,157,795).

Figure 5A:
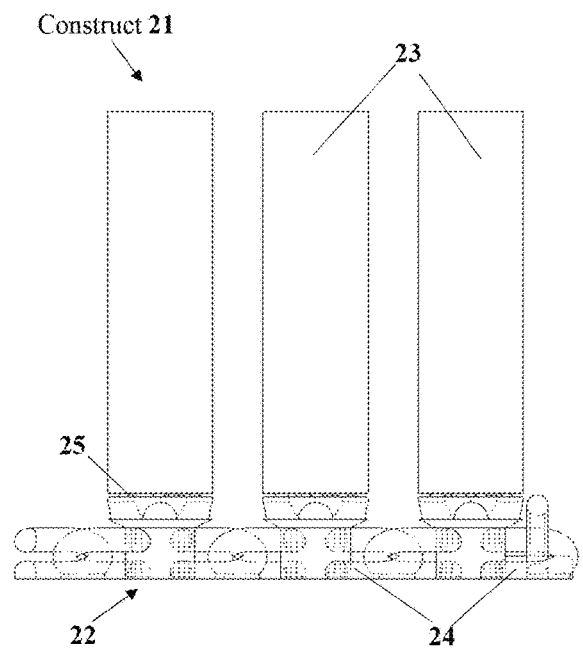
FIG. 5A is a side view of a construct as described herein, showing three substantially identical parts connected to the backing chain by a frangible linker segment.
Figure 5B:
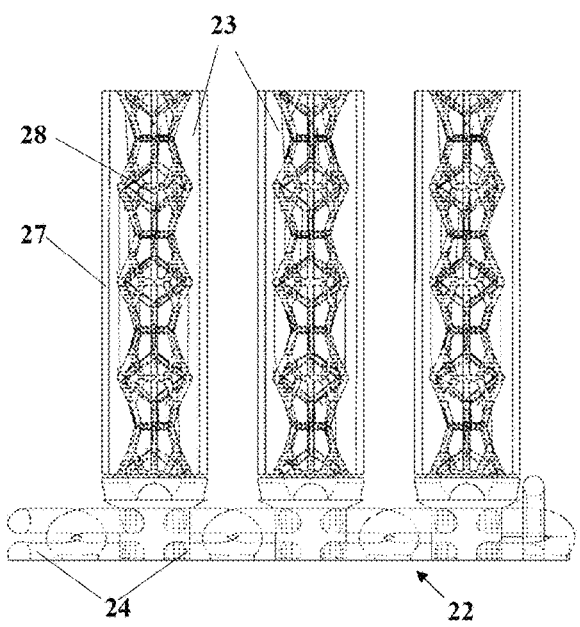
FIG. 5B is a side sectional view of the construct of FIG. 5A, showing the internal features (a lattice) of the hollow parts.
Figure 7:
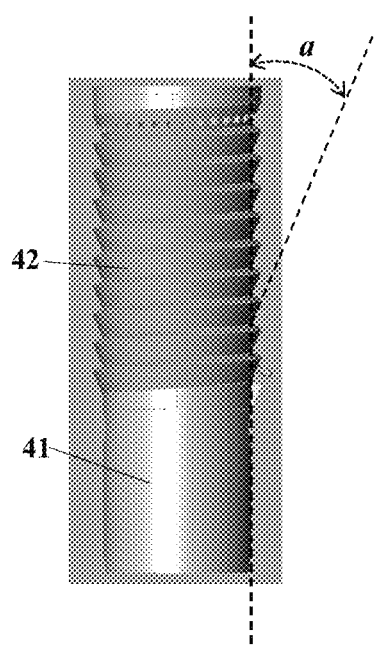
FIG. 7 is a side view of the core of FIG. 6A showing the angle at which the spiral track is offset from the surface thereof.

The constructs and methods described herein are useful for carrying out metrology on a wide variety of parts. In some embodiments (and as illustrated in FIG. 5B), each part can include a wall portion (27) defining an internal cavity, and optionally but preferably at least one feature (e.g., a rib, beam, detent, lattice (28), port, filter or sieve, etc.) formed on the wall portion within the internal cavity.

As shown in FIGS. 6A-6B, the core (41) or bobbin can have a spiral track (42) formed thereon, the spiral track configured to receive the backing and guide spiral winding thereof around the core or bobbin. The spiral may be steep or shallow, and may be closely spaced (as illustrated) or widely spaced (i.e., when the backing is carrying larger parts), depending upon the size and shape of the parts being carried (as it is preferred that adjacent parts on the core not contact one another). As shown in FIG. 6B, a core assembly (51) includes the core (41) with the backing (22) and plurality of parts (23) wrapped around the core. As further shown in FIG. 7, the spiral track is, in some embodiments, preferably angled at an acute angle ($\alpha$) with respect to the bobbin surface. In some embodiments, angle will depend upon considerations such as the size and shape of the parts, the steepness and tightness of the spiral, etc., but in some embodiments at an angle ($\alpha$) of from 5 or 10 degrees to 40 or 60 degrees. The angle better presents or may improve the position of the parts with respect to the direction of the X-rays in the imaging apparatus and hence facilitates more accurate measurement of the parts.

Figure 8:
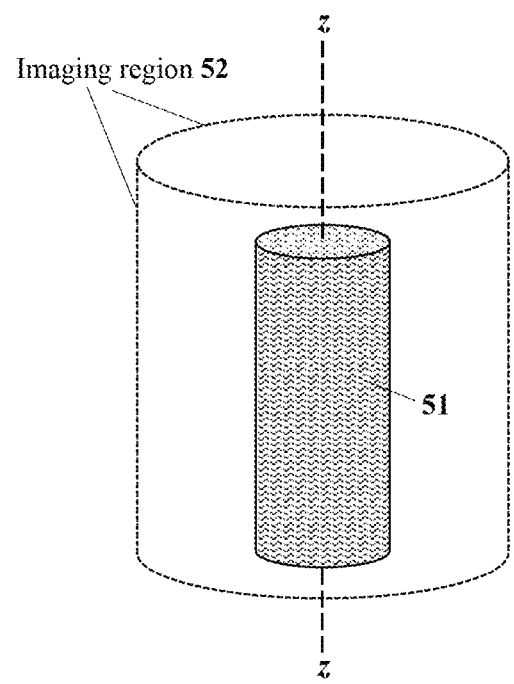
FIG. 8 is a schematic illustration showing how a cylindrical core having a construct spirally wound around it can be positioned for imaging with its center axis z-z aligned with the center axis of the imaging region of the imaging apparatus.

As schematically illustrated in FIG. 8, in some preferred embodiments the core is cylindrical, and the imaging apparatus has a cylindrical imaging region. For these, the core has a central axis (z-z), the imaging region has a central axis (z-z), and the core central axis is preferably aligned with (or co-centric with) the imaging region central axis during the imaging step.

An advantage of some embodiments of the processes and constructs described herein is the large number of parts that can be handled. In some embodiments, the plurality of parts additively manufactured on the backing may comprise at least thirty, sixty, 100, or 200 parts, or more. In cases where the build platform can produce more parts than an individual core can hold, the construct, with the parts, can be divided into subsections, the subsections placed on different cores, and the set of cores with the parts imaged individually. Thus, quality control can be performed on additive manufacturing batches much larger than what can be imaged at one time.

In some embodiments, the plurality of parts are substantially identical to one another (i.e., all generated from the same data file, subject to variations resulting from the additively manufacturing process). This may be the case when each of the plurality of parts comprises preceding claim, wherein each the part comprises a connector (e.g., an electrical, optical, mechanical, or fluid connector), mechanical/micromechanical device, fluidic/microfluidic device, or the like. However, in other embodiments, the parts need not be substantially identical. For example, non-uniform parts such as test parts may be intentionally embedded into the batch of parts on the same backing to study production phenomenon or to search through landscapes of multiple part variations to identify the best parts for commercial production.

The foregoing is illustrative of the present invention, and is not to be construed as limiting thereof. The invention is defined by the following claims, with equivalents of the claims to be included therein.

I claim:

1. A method of additively manufacturing a plurality of parts, the method comprising:
    additively manufacturing a construct, the construct comprising: (i) a backing, and (ii) a plurality of parts connected to said backing;
    inserting said backing into an imaging apparatus in an orientation in which said plurality of parts are positioned for imaging; then
    imaging said plurality of parts in said imaging apparatus to collect image data from each part, and then
    removing said construct from said imaging apparatus and separating said parts from said backing;
    correlating said image data for each part with a build position for each said part on a build platform; and
    comparing said image data for each part and/or compiled or aggregated image data for said plurality of parts, against a standard, as a quality control measure of said method of manufacturing, and/or to identify defective build regions in said apparatus.

2. The method of claim 1, wherein said inserting step comprises (i) wrapping said backing around a core with said parts protruding outward from said core, and then (ii) inserting said core into said imaging apparatus.

3. The method of claim 2, wherein said backing comprises a chain of independent, pivotably interconnected links.

4. The method of claim 2, wherein said core is cylindrical, and said imaging apparatus has a cylindrical imaging region.

5. The method of claim 4, wherein said core has a central axis, said imaging region has a central axis, and said core central axis is aligned with said imaging region central axis during said imaging step.

6. The method of claim 2, wherein said core is a bobbin and has a spiral track formed thereon, said spiral track configured to receive said backing and guide spiral winding thereof around said bobbin.

7. The method of claim 6, wherein said spiral track is angled at an acute angle with respect to the bobbin surface.

8. The method of claim 1, wherein said imaging apparatus comprises an X-ray imaging apparatus.

9. The method of claim 1, wherein said imaging apparatus comprises a computerized tomography (CT) scanner or computerized axial tomography (CAT) scanner.

10. The method of claim 1, wherein said image data comprises two-dimensional image data, three-dimensional image data, or a combination thereof.

11. The method of claim 1, said construct further comprising a frangible linker or a releasable layer between said backing and each said part of said plurality of parts.

12. The method of claim 1, wherein said plurality of parts comprises at least thirty parts.

13. The method of claim 1, wherein each of said plurality of parts are substantially identical to one another.

14. The method of claim 1, wherein said construct is additively manufactured on a build platform.

15. The method of claim 14, wherein said backing comprises a preformed sheet, backbone, or chain mounted on said build platform.

16. The method of claim 14, wherein said backing is produced by additive manufacturing during said additive manufacturing step.

17. The method of claim 16, wherein said backing comprises a chain additively manufactured during said additive manufacturing step prior to manufacturing said plurality of parts.

18. The method of claim 1, further comprising the step of:
recording a build position for each of said plurality of parts during said additively manufacturing step.

19. The method of claim 1, wherein each said part comprises a body having a wall portion defining an internal cavity, and at least one feature formed on said wall portion within said internal cavity.

20. The method of claim 1, wherein each said part comprises a connector, mechanical/micromechanical device, or fluidic/microfluidic device.

21. A method of additively manufacturing a plurality of parts, the method comprising:
additively manufacturing a construct, the construct comprising: (i) a backing, and (ii) a plurality of parts connected to said backing;
inserting said backing into an imaging apparatus in an orientation in which said plurality of parts are positioned for imaging; then
imaging said plurality parts in said imaging apparatus to collect image data from each part,
and then removing said construct from said imaging apparatus and separating said parts from said backing, wherein said backing is produced by additively manufacturing during said additive manufacturing step prior to manufacturing said plurality of parts, and said backing comprises a chain adhered to said build platform in a space filing curve, said space filing curve optionally but in some embodiments preferably comprising a Peano curve, Hilbert curve, dragon curve, Gosper curve, Moore curve, or Sierpinski curve.

* * * * *